N. P. COURTNEY

RECEPTACLE OPENER

May 3, 1932.

Re. 18,447

Original Filed June 27, 1930

Inventor

N. P. Courtney

By James F. Splain

Attorney

Reissued May 3, 1932 Re. 18,447

UNITED STATES PATENT OFFICE

NICHOLAS P. COURTNEY, OF PASSAIC, NEW JERSEY

RECEPTACLE OPENER

Original No. 1,826,740, dated October 13, 1931, Serial No. 464,290, filed June 27, 1930. Application for reissue filed December 26, 1931. Serial No. 583,411.

The present invention relates generally to the art of receptacle openers and more particularly to the form of opener which is fastened to the receptacle or its cover, whether it be a can, drum or canister, and usually sold as part thereof.

The prime object of the invention resides in the provision of a receptacle opener for the removal of lids or friction plugs which usually must be removed by some sort of prying implement and in my device it is attached to the receptacle but located on the cover thereof and capable of being moved about the periphery in either clockwise or counterclockwise direction, so that the prying action may be accomplished at different points of the friction plug to effectively and efficiently pry open the lid or cover.

A still further very important object of the invention resides in the provision of the device of this nature which is exceedingly simple in its construction, inexpensive to manufacture and when applied to the top of a receptacle folds into the cover depression and permits the stacking of receptacles so equipped without interference.

Another important provision of the invention lies in the fact that after the cover of a receptacle has been opened by my device the said cover may be replaced on receptacle without effort and the device restored to its normal position, when it becomes available to re-open the cover when next needed, and it does not interefere in restoring the cover to its original tightness on the receptacle.

With the above and numerous other objects in view as will appear as the description proceeds, the invention resides in certain novel features of construction, and in the combination and arrangement of parts as will be hereinafter more fully described and claimed.

Figure 1:
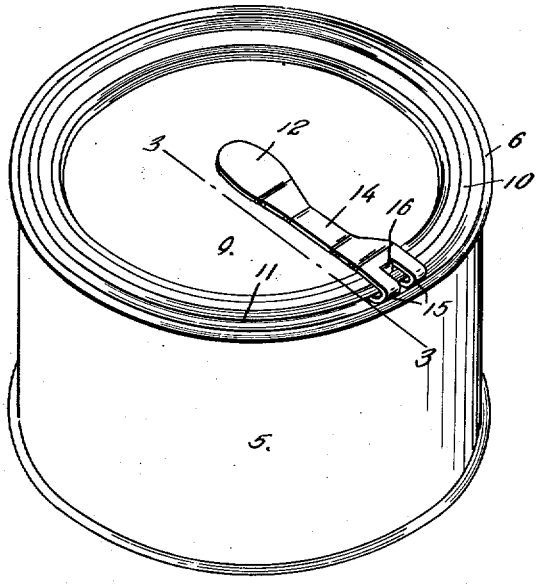
Figure 1 is a perspective view of the can embodying the features of my invention.

Referring to the drawings in detail, it will be seen that the numeral 5 denotes a can the open upper end of which is provided with an inwardly directed flange 6 formed with a shoulder 7 merging into an annular channel extension 8. The numeral 9 denotes a lid or cover having a peripheral annular bead 10 and formed with a rib 11 to be received in the annular channel extension 8.

Figure 2:
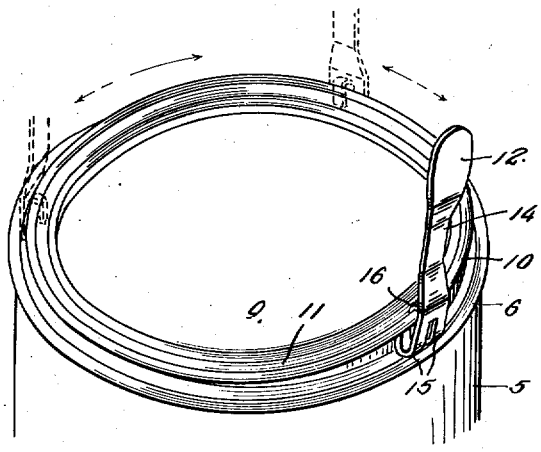
Fig. 2 is a similar view showing the implement in a raised position.
Figure 3:
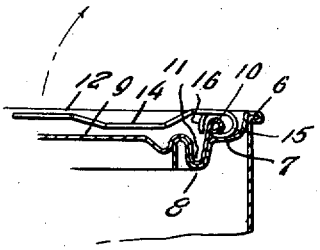
Fig. 3 is a detail section taken substantially on the line 3—3 of Figure 1.

My improvement comprises the provision of an implement which is herein shown as an elongated handle 12 having an offset intermediate portion 14. One end of the handle terminates in a curved extension 15 the terminal of which is engaged under the bead 10. A tongue 16 is struck from the end having the extension 15 to be disposed on the inner side of the bead so as to prevent the removal of the implement from its engagement with the bead. The convexly curved extension 15 at the heel of the implement is materially advantageous since it bears and is adapted to be turned on the can in lifting the lid so as to increase the cam action and consequently increase the lift to force open the lid as the lever is operated. The extremity of the said convexly curved portion engages the lid and has a prying action on the same, and the greatest leverage is exerted at the beginning of the operation of lifting the lid when it is most needed. The handle 12, of course, only extends in substantial parallelism with the lid 9 but when the inner end thereof is swung upwardly, the end of the extension 15 pries open that portion of the lid with which it is engaged and then the implement may be moved around to another position as indicated in dotted lines in Figure 2 and the same operation gone through so that the lid may be pried open all around in an effective and efficient manner and with considerable ease.

It will be observed that in the preferred form of the invention the implement is constructed of stiff and rigid sheet metal, and preferably of one piece. It will also be observed that that part of the camming portion which lies beneath the bead on the exterior is sufficiently thin to permit it to occupy this position when the plug or lid is closed. By making the implement of considerable breadth the degree of stiffness and rigidity necessary to make a practical instrument may be secured with metal which throughout is of the thinness required for that part of the camming portion which lies beneath the bead.

It is thought that the construction, utility and advantage of this invention will now be quite apparent to those skilled in this art without a more detailed description thereof. The present embodiment of the invention has been described in considerable detail merely for the purpose of exemplification since in actual practice it attains the features of advantages enumerated as desirable in the statement of the invention and the above description. It will be apparent that changes in details of construction, and in the combination and arrangement of parts may be resorted to without departing from the spirit and scope of the invention as hereinafter claimed and sacrificing any of its advantages.

What I claim is:

1. As a new article of manufacture, a receptacle opener, wherein the receptacle includes a lid having a peripheral annular bead, comprising an elongated prying implement formed in one piece having a handle with a convexly curved heel end extension constituting a bearing terminating under the bead, said extension having a longitudinal intermediate portion struck therefrom and forming a tongue curved to be disposed on the other side of said bead to prevent detachment of the implement from the bead but permitting the implement to be slid around the bead for prying action at different points.

2. As a new article of manufacture, a receptacle opener for receptacles having a lid with a peripheral annular bead, said opener comprising a stiff and rigid prying implement fulcrumed to said bead, said implement having a handle, and a prying portion, the prying portion comprising a curved camming surface extending outward beyond the bead and then downwardly and inwardly to a point below said bead, and said implement having means for hinging it loosely to said bead, said hinging means permitting said implement to be slid around the bead for prying actions at different points, and said curved camming surface adapted when the handle is raised to exert a prying force against the can through progressively different portions of the curved camming surface, and that part of the camming portion lying below the bead being formed of flat and thin metal so as to enable the lid to be closed with said part of the camming portion in position beneath the bead.

3. As a new article of manufacture, a receptacle opener for receptacles having a lid with a peripheral annular bead, said opener comprising a stiff and rigid prying implement fulcrumed to said bead, said implement having a handle and a prying portion, the prying portion comprising a curved camming surface extending outward beyond the bead and then downwardly and inwardly to a point below said bead, and constituting one member of a hinging means, and said implement having a portion extending below the top of said bead on the opposite side from said prying portion, and constituting a complemental hinging means and said curved camming surface adapted when the handle is raised to exert a prying force against the can through progressively different portions of the curved camming surface, said hinging means permitting said implement to be slid around the bead for prying actions at different points, and that part of the camming portion lying below the bead being formed of flat and thin metal so as to enable the lid to be closed with said part of the camming portion in position beneath the bead.

4. The opener of claim 3, further characterized in that the complemental hinging portions are so constructed with relation to the bead that the opener is permanently connected with the can lid.

5. The opener of claim 3, in which all of the portions of the opener are constructed of a single thin, flat, and stiff piece of sheet metal, the complementary hinging portion being struck downwardly from the general plane of the opener to a point approximating the lower side of the bead.

In witness whereof, I have hereunto signed my name.

NICHOLAS P. COURTNEY.